US009057399B2

(12) United States Patent
Bell et al.

(10) Patent No.: US 9,057,399 B2
(45) Date of Patent: Jun. 16, 2015

(54) IDLER GEAR STUB SHAFT

(71) Applicant: Electro-Motive Diesel, Inc., La Grange, IL (US)

(72) Inventors: Stuart Leighton Bell, Chicago Heights, IL (US); Abhinav Reddy Pamulaparthy, Aurora, IL (US); Jeffrey P. Nowak, Munster, IN (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 21 days.

(21) Appl. No.: 13/958,341

(22) Filed: Aug. 2, 2013

(65) Prior Publication Data

US 2015/0033893 A1 Feb. 5, 2015

(51) Int. Cl.
*F16H 57/04* (2010.01)
*F16H 55/17* (2006.01)
*F16C 3/02* (2006.01)

(52) U.S. Cl.
CPC .......................................... *F16C 3/02* (2013.01)

(58) Field of Classification Search
CPC ......... F16H 63/30; F16H 3/089; F16H 57/02; F16H 57/04; F16H 57/043; F16H 2057/0235; F16H 57/0423; F16H 57/0424; F16H 57/0426; F02F 7/0043; F16D 21/04
USPC ........ 123/196 R, 195 A, 195 C, 198 DA, 1 R, 123/1 A; 74/434, 439, 467
See application file for complete search history.

(56) References Cited

U.S. PATENT DOCUMENTS

| | | | | |
|---|---|---|---|---|
| 1,979,904 A | * | 11/1934 | Roberts | 74/8 |
| 2,781,237 A | | 2/1957 | Masse | |
| 3,888,226 A | * | 6/1975 | Wallace | 123/195 A |
| 3,897,691 A | * | 8/1975 | Robinson | 74/405 |
| 4,607,601 A | * | 8/1986 | Kohler | 123/90.31 |
| 4,665,766 A | * | 5/1987 | Umeha et al. | 74/567 |
| 4,671,223 A | * | 6/1987 | Asano et al. | 123/90.31 |
| 4,827,881 A | * | 5/1989 | Baker et al. | 123/196 R |
| 4,955,335 A | * | 9/1990 | Jingu et al. | 123/90.31 |

(Continued)

FOREIGN PATENT DOCUMENTS

| | | |
|---|---|---|
| JP | 2002-201924 A | 7/2002 |
| KR | 2007-0062037 A | 6/2007 |

OTHER PUBLICATIONS

710G3B/G3C Series Turbocharged Engine Maintenance Manual, Jul. 1999 (Revised Oct. 2005), pp. 7-20, 7-21, 7-23.

*Primary Examiner* — Marguerite McMahon
*Assistant Examiner* — Tea Holbrook
(74) *Attorney, Agent, or Firm* — Finnegan, Henderson, Farabow, Garrett & Dunner, LLP

(57) ABSTRACT

A stub shaft is disclosed. The stub shaft may have an elongated cylindrical body having a base end configured to be secured to an engine block and an opposing distal end. The stub shaft may also have a collar formed at the base end of the elongated cylindrical body. The collar may be configured to be inserted into a cavity in the engine block to guide attachment of the stub shaft to the engine block. The stub shaft may further have an axial bore formed in the elongated cylindrical body and passing from the base end to the distal end. The stub shaft may also have a radial passage formed in the elongated cylindrical body and in fluid communication with the axial bore. The stub shaft may additionally have a thrust face formed between the base end and the radial passage.

19 Claims, 4 Drawing Sheets

(56) References Cited

U.S. PATENT DOCUMENTS

| | | | |
|---|---|---|---|
| 5,540,112 A * | 7/1996 | Baker et al. | 74/409 |
| 5,542,383 A * | 8/1996 | Clarke et al. | 123/90.17 |
| 5,647,246 A * | 7/1997 | Craft et al. | 74/467 |
| 5,826,461 A * | 10/1998 | Kaywood et al. | 74/567 |
| 5,946,971 A * | 9/1999 | Toyota et al. | 74/331 |
| 7,363,904 B2 * | 4/2008 | Utsumi et al. | 123/196 R |
| 7,380,530 B2 * | 6/2008 | Schafer et al. | 123/90.17 |
| 8,555,838 B2 * | 10/2013 | Petry-Johnson et al. | 123/90.31 |
| 2005/0150725 A1 * | 7/2005 | Utsumi et al. | 184/6.5 |
| 2008/0066711 A1 * | 3/2008 | Takano et al. | 123/195 C |
| 2009/0084208 A1 | 4/2009 | Hayakawa et al. | |
| 2012/0285414 A1 | 11/2012 | Petry-Johnson et al. | |
| 2012/0298068 A1 * | 11/2012 | LaGatta et al. | 123/196 R |

* cited by examiner

IDLER GEAR STUB SHAFT

TECHNICAL FIELD

The present disclosure is directed to a stub shaft and, more particularly, to an idler gear stub shaft.

BACKGROUND

Engines produce mechanical power in which reciprocating motion of one or more pistons causes rotational motion of a crankshaft. The rotational energy of the crankshaft is transmitted to other devices, such as wheels of a vehicle. In addition, the rotational energy of the crankshaft can be transmitted to a gear (or belt) on the end of the crankshaft. The gear may be part of a gear train that transmits rotational energy to accessory features of the engine (e.g., to pumps, a camshaft, etc.). These types of gear trains often include one or more idler gears that allow the rotational direction and/or gear ratio of accessory gears in the gear train to be established as necessary. The idler gears may be mounted to an appropriate portion of the engine by a stub shaft.

An exemplary stub shaft is described in U.S. Patent Application Publication No. 2012/0298068, which published on Nov. 29, 2012 ("the '068 publication). The '068 publication describes an oil pump that includes a stub shaft for an idler gear. The stub shaft includes a fastener bore through which a threaded fastener extends to attach the stub shaft to a housing of the oil pump. An idler gear is connected to an end of the stub shaft, and lubricated by way of separately drilled passages in the stub shaft.

While the stub shaft of the '068 publication may be suitable for some applications, it may have some drawbacks. For example, the stub shaft of the '068 publication is secured at only one end, which may allow for flexing or movement of the stub shaft during use. Further, the stub shaft positions the idler gear against the pump housing, which may be unsuitable for other applications. In addition, the use of separately drilled passages within the stub shaft to supply oil to the idler gear may be undesirable for relatively narrow diameter stub shafts, in which space is limited.

The present disclosure is directed to overcoming one or more of the problems set forth above and/or other problems of the prior art.

SUMMARY

In one aspect, the present disclosure is directed to a stub shaft. The stub shaft may include an elongated cylindrical body having a base end configured to be secured to an engine block and an opposing distal end. The stub shaft may also include a collar formed at the base end of the elongated cylindrical body. The collar may be configured to be inserted into a cavity in the engine block to guide attachment of the stub shaft to the engine block. The stub shaft may further include an axial bore formed in the elongated cylindrical body and passing from the base end to the distal end. The stub shaft may also include a radial passage formed in the elongated cylindrical body and in fluid communication with the axial bore. The stub shaft may additionally include a thrust face formed between the base end and the radial passage.

In another aspect, the present disclosure is directed to an idler gear mounting assembly. The idler gear mounting assembly may include a stub shaft. The stub shaft may include an elongated cylindrical body having a base end configured to be secured to an engine block and an opposing distal end. The stub shaft may also include an axial bore formed in the elongated cylindrical body and passing from the base end to the distal end. The stub shaft may further have a radial passage formed in the elongated cylindrical body and in fluid communication with the axial bore. The idler gear mounting assembly may also include a threaded rod extending through the axial bore. The threaded rod may be configured to secure the base end of the stub shaft to the engine block and the distal end of the stub shaft to a gear cover

DETAILED DESCRIPTION

Figure 1:
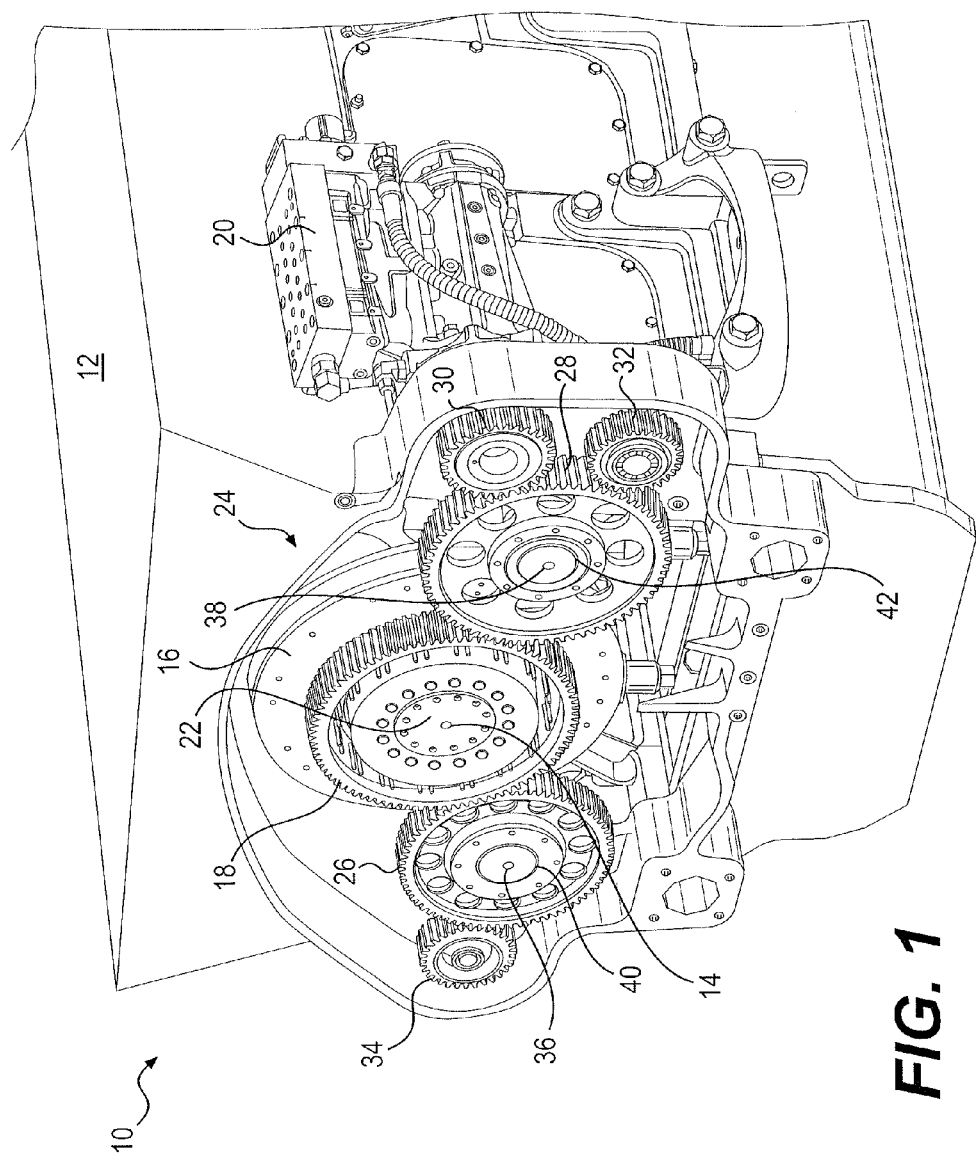
FIG. 1 is an isometric illustration of an exemplary disclosed engine.

FIG. 1 illustrates an accessory end of an exemplary engine 10 consistent with certain disclosed embodiments. Engine 10 may be an internal combustion engine, such as a diesel engine, a gasoline engine, a gaseous-fuel powered engine, or a dual-fuel engine. For example, engine 10 may be a diesel-fueled locomotive engine having twelve cylinders. One skilled in the art will recognize, however, that engine 10 may be any other type of combustion or non-combustion engine capable of producing mechanical output. Engine 10 may include a engine block 12 housing a crankshaft 14. Crankshaft 14 may be rotationally driven inside engine block 12 by reciprocal motion of a plurality of pistons (not shown) in the engine cylinders, in a manner known in the art. Rotational motion of the crankshaft may be transmitted as an output to power traction devices of the locomotive, for example.

Crankshaft 14 may be connected to a harmonic damper 16 and a drive gear 18 on the accessory end of engine 10. Damper 16 may help reduce vibration of crankshaft 14 as it rotates within engine block 12. Drive gear 18 may be mounted to a free end of crankshaft 14, on an outer side of damper 16 with respect to engine block 12. Drive gear 18 may be secured to rotate with crankshaft 14 by a gear plate 22 (shown only in FIG. 2). As crankshaft 14 rotates, rotational energy may be transferred to drive gear 18.

Drive gear 18 may be a part of a gear train 24. Gear train 24 may include, in addition to drive gear 18, a plurality of idler gears 26, 28, and a plurality of accessory gears 30, 32, 34. A gear cover 82 (shown only in FIG. 4) may engage an outer portion of engine block 12 and cover an outer side of one or more of drive gear 18, idler gears 26, 28, and accessory gears 30, 32, and 34. Gear train 24 may be arranged such that drive gear 18 transfers rotational energy to accessory gears 30, 32, 34 through idler gears 26, 28. Accessory gears 30, 32, 34 may be configured to transfer the received rotational energy to one or more engine accessories associated with a respective accessory gear 30, 32, or 34. For example, accessory gear 30 may be operably connected to a fuel pump 20. As accessory gear 30 rotates, fuel pump 20 may pressurize fuel for delivery to the cylinders of engine 10. Accessory gears 32, 34, may be operably connected to other engine accessories, such as an oil pump and a water pump (not shown), respectively.

Figure 4:
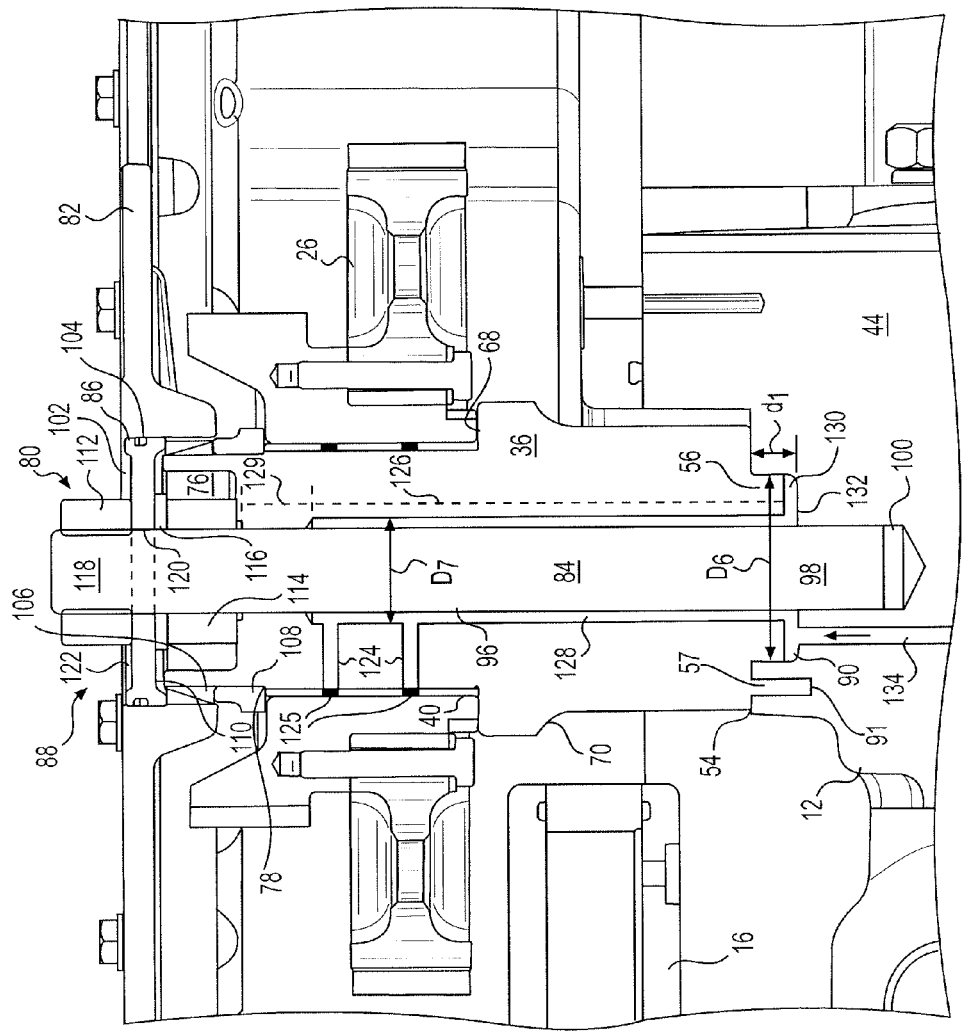
FIG. 4 is a cross-sectional illustration of the stub shaft of FIG. 3 connected to the engine of FIG. 1.

Idler gears 26, 28 may be arranged between drive gear 18 and accessory gears 30, 32, 34 in gear train 24. Idler gears 26, 28 may be sized and arranged according to a desired gear ratio between drive gear 18 and accessory gears 30, 32, 34. In this way, the rotational speed of accessory gears 30, 32, 34 may be controlled to a desired proportion of the rotational speed of drive gear 18. In addition, the rotational direction of accessory gears 30, 32, and 34 may be set to the same direction as drive gear 18. Similarly, one or more of idler gears 26, 28 may be a gear tree that includes two sets gear teeth set at different radial positions. For example, idler gear 26 (as shown in FIG. 4) may be a gear tree that includes a top gear configured to connect to accessory gear 34 and a larger bottom gear configured to connect to drive gear 18. Idler gears 26, 28 may be secured to engine block 12 by stub shafts 36, 38. Idler gears 26, 28 may freely rotate on stub shafts 36, 38, respectively, via one or more bearings 40, 42.

Figure 2:
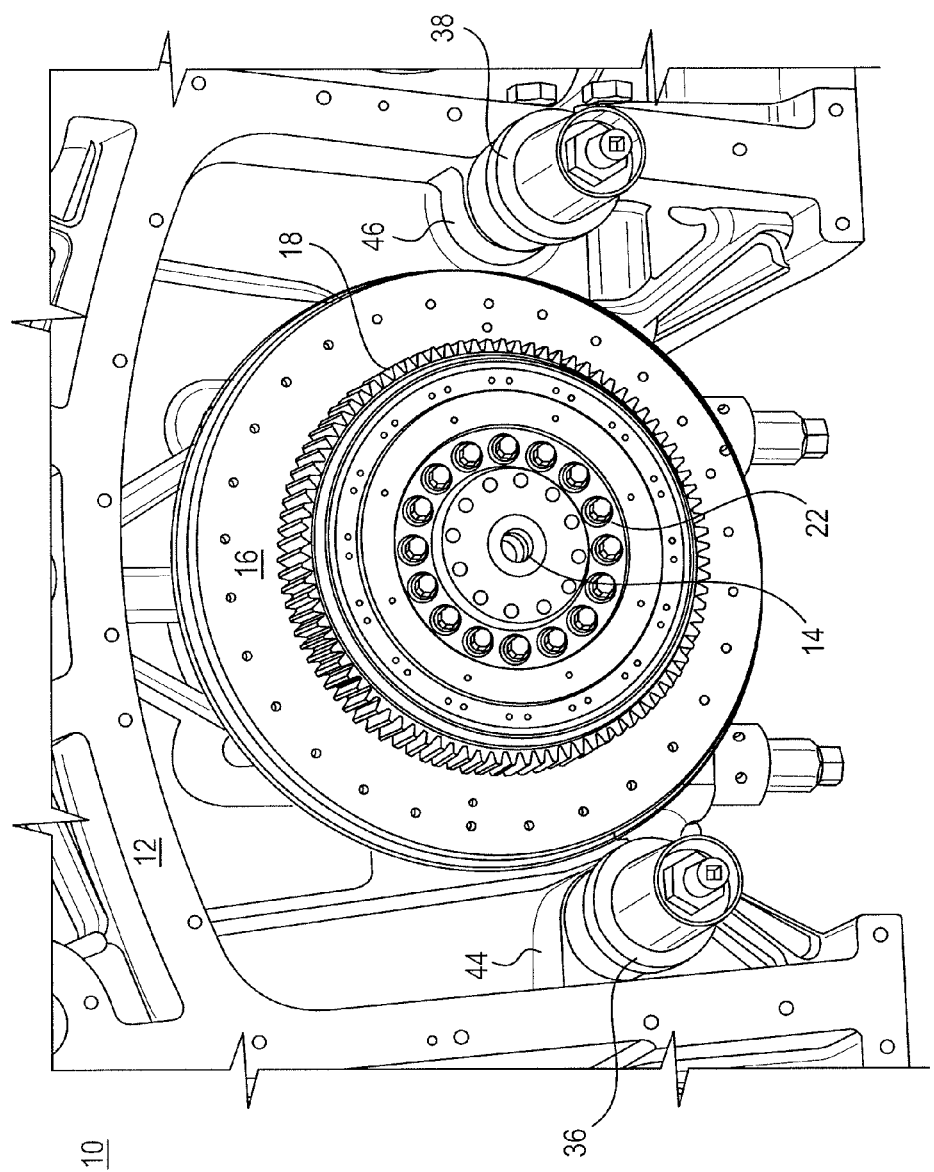
FIG. 2 is an isometric illustration of exemplary disclosed stub shafts connected an end of the engine of FIG. 1.

FIG. 2 illustrates stub shafts 36, 38 positioned on engine block 12 in relation to crankshaft 14 and drive gear 18 (e.g., at opposing sides of drive gear 18). Stub shafts 36, 38 may be secured to engine block 12 at a first stub shaft mount 44 and a second stub shaft mount 46, respectively. First and second stub shaft mounts 44, 46, may be integrally formed portions of engine block 12. In other embodiments, first and second stub shaft mounts 44, 46 may be separately-formed adapters configured to be secured to engine block 12, such as by bolts. First and second stub shaft mounts 44, 46 may be shaped to match a portion of each stub shaft 36, 38. In this way, there may be sufficient clearance between first and second stub shaft mounts 44, 46 to allow crankshaft 14, with damper 16 attached, to be installed in engine block 12.

Figure 3:
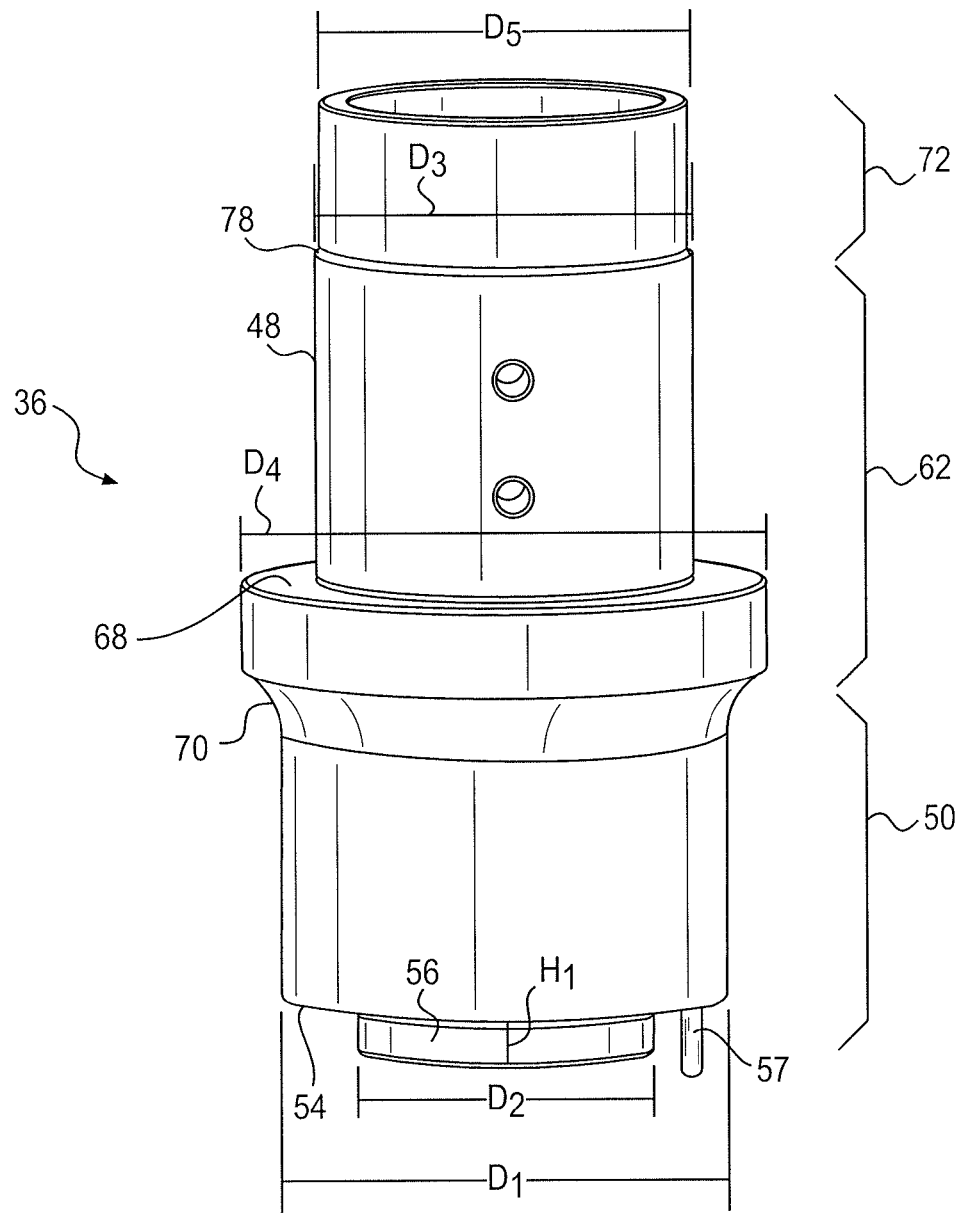
FIG. 3 is a side view illustration of one of the stub shafts of FIG. 2.

FIG. 3 illustrates an exemplary disclosed stub shaft 36, although it should be understood that stub shaft 38 may take the same or similar form. Stub shaft 36 may include an elongated shaft body 48. Shaft body 48 may be generally cylindrical, with a plurality of concentric sections including varying outer diameters. For example, stub shaft 36 may include a base end 50, a center portion 62, and a distal end 72.

Base end 50 may include an outer diameter $D_1$. In an exemplary embodiment, outer diameter $D_1$ may be sized to match a shape of an adjacent portion of first stub shaft mount 44 (seen in FIG. 2). Base end 50 may further include an end surface 54, a collar 56, and a dowel pin 57. Collar 56 may be a generally cylindrical feature extending from end surface 54 and configured to guide attachment of stub shaft 36 to first stub shaft mount 44. Collar 56 may include a height $H_1$ and an outer diameter $D_2$. Dowel pin 57 may similarly extend from end surface 54.

Center portion 62 may include a first outer diameter $D_3$ and a second outer diameter $D_4$. First outer diameter $D_3$ may be less than second outer diameter $D_4$ such that a thrust face 68 is foamed. Thrust face 68 may be a generally planar surface configured to position idler gear 26 on stub shaft 36. First outer diameter $D_3$ may be less than outer diameter $D_1$ and second outer diameter $D_4$ may be greater than outer diameter $D_1$. In an exemplary embodiment, outer diameter $D_1$ may be about 70-95% of second outer diameter $D_4$, which may be about 70-95% of an axial distance between thrust face 68 and end surface 54 (i.e., collar 56). A rounded portion 70 may connect center portion 62 to base end 50 (i.e., second outer diameter $D_4$ to outer diameter $D_1$).

Distal end 72 may include an outer diameter $D_5$. Distal end 72 may also include a recess 76. Recess 76 may be configured to receive a nut or other fastener, as will be described in more detail below. In an exemplary embodiment, outer diameter $D_5$ may be less than first outer diameter $D_3$ such that a ledge 78 is formed between distal end 72 and center portion 62.

FIG. 4 depicts a cross-sectional view of stub shaft 36 secured to first stub shaft mount 44. Stub shaft 36 includes base end 50 configured to be secured to engine block 12. In the exemplary disclosed embodiment, at base end 50, collar 56 may be configured to extend into a cavity 90 formed by first stub shaft mount 44. Cavity 90 may be generally cylindrical and include a depth $d_1$, and a diameter $D_6$. Diameter $D_6$ may be substantially the same as outer diameter $D_2$, such that collar 56 fits snugly in cavity 90. Cavity 91 may be similarly configured to receive dowel pin 57. In this way, collar 56 may guide attachment of stub shaft 36 to engine block 12 as collar 56 is inserted into cavity 90 until end surface 54 makes planar contact with an outer portion of first stub shaft mount 44. In embodiments that include dowel pin 57 and cavity 91, alignment and insertion of dowel pin 57 may also help guide attachment of stub shaft 36. Dowel pin 57 and cavity 91 may be arranged on end surface 54 and first stub shaft mount 44, respectively, such that stub shaft 36 is attached to first stub shaft mount 44 in a desired "clocked" position (i.e., stub shaft 36 is axially rotated to a desired position for attachment).

Stub shaft 36 may be a component of an idler gear mounting assembly 80 that is configured to secure idler gear 26 in place on engine 10. In an exemplary embodiment, idler gear mounting assembly 80 may include components configured to secure base end 50 of stub shaft 36 to first stub shaft mount 44 and secure distal end 72 to gear cover 82. For example, idler gear mounting assembly 80 may include a threaded rod 84, a cap 86, and hardware 88. Threaded rod 84 may be configured to extend through an axial bore 96 formed in stub shaft 36. Threaded rod 84 may include a first threaded end 98 configured to mate with a threaded hole 100 formed in engine block 12 at first stub shaft mount 44.

At distal end 72, stub shaft 36 may be secured to gear cover 82 by cap 86 and hardware 88. Cap 86 may be shaped to match a generally cylindrical opening 102 in gear cover 82. For example, cap 86 may be a generally cylindrical member configured to fit in generally cylindrical opening 102 of gear cover 82. Cap 86 may include an O-ring 104 configured to frictionally engage gear cover 82 and hold cap 86 in place within opening 102. Hardware 88 may include, among other things, a split ring washer 106 and a spacer 108 secured between cap 86 and ledge 78. That is, split ring washer 106 may be positioned against an inner surface 110 of cap 86, and spacer 108 may be positioned against ledge 78, such that split ring washer 106 may exert a spring force on cap 86 and on ledge 78 via spacer 108.

Hardware 88 may also include an outer nut 112, an inner nut 114, and a washer 116. Distal end 72, cap 86, split ring washer 106, and spacer 108 may be secured in place by threaded rod 84, outer nut 112, and inner nut 114. For example, threaded rod 84 may include a second threaded end 118 configured to mate with first and second nuts 112, 114. Inner nut 114 may be positioned at inner surface 110 of cap 86 and secured to second threaded end 118. Inner nut 114 may be positioned in recess 76 and secured against a surface of stub shaft 36 to further secure stub shaft 36 to engine block 12 at first stub shaft mount 44. Washer 116 may be placed between inner nut 114 and cap 86 to maintain contact throughout from inner nut 114 to engine block 12. Threaded rod 84 may extend through an aperture 120 in cap 86 and outer nut 112 may be secured to second threaded end 118 on an outer side 122 of cap 86. Outer nut 112 may be tightened to exert a force that holds cap 86 in place in relation to gear cover 82.

Idler gear 26 may be mounted on stub shaft 36 by bearing 40. Idler gear 26 may be positioned adjacent thrust face 68 by bearing 40. In an exemplary embodiment, bearing 40 may be a cylindrical journal bearing in contact with an outer surface of center portion 62 and an inner surface of idler gear 26. However, it should be understood that bearing 40 may be a ball bearing, a magnetic bearing, or any other type of bearing known in the art.

Stub shaft 36 may be configured to provide lubricant (e.g., oil) to bearing 40 through a path formed within stub shaft 36. The path may include axial bore 96 and one or more radial passages 124 in fluid communication with axial bore 96. In an exemplary embodiment, radial passages 124 includes two radial passages positioned at different locations along the length of axial bore 96. Bearing 40 may include one or more openings 125 aligned with radial passages 124 such that lubricant may be supplied to bearing 40.

Axial bore 96 may include a first section 126 adjacent base end 50 with a diameter $D_7$ that is greater than a diameter of threaded rod 84. In this way, an axial passage 128 is formed along first section 126 within stub shaft 36. Axial passage 128 may form a space around an outside of threaded rod 84 (when threaded rod 84 is installed in stub shaft 36), inside axial bore 96. A second section 129 of axial bore 96 adjacent distal end 172 may have diameter that is smaller than diameter $D_7$ and substantially the same as the diameter of threaded rod 84, such that lubricant is inhibited from flowing into second section 129.

A well 130 may be formed between collar 56 and an inner surface 132 of cavity 90. Well 130 may be in fluid communication with axial passage 128 when stub shaft 36 and threaded rod 84 are connected to first stub shaft mount 44. In particular, height $H_1$ of collar 56 may be less than depth $d_1$ of cavity 90, and this difference may create well 130. Well 130 may serve as a lubricant well for supplying lubricant to axial passage 128. Well 130 may be fluidly connected to an oil supply passage 134 formed in engine block 12. Oil supply passage 134 may fill well 130 with pressurized oil, which may be delivered to bearing 40 through axial passage 128 and radial passages 124. An oil pump (not shown) connected to one of accessory gears 30, 32, 34 may pressurize oil supply passage 134.

INDUSTRIAL APPLICABILITY

The exemplary disclosed stub shaft may be used in any system to attach a gear or other rotating body to a stationary object. The stub shaft may be particularly applicable to supporting rotation of an idler gear, such as between an engine block and a gear cover. When used in this manner, several advantages of the exemplary disclosed stub shaft are evident. For example, the stub shaft may allow for a secure connection that supports the stub shaft at both ends. During operation, idler gears may exert a torque force on an associated stub shaft. Supporting the stub shaft at both ends helps prevent this force from flexing, loosening, or damaging the stub shaft. Further, the shape of the base end of the stub shaft allows for guided attachment to the engine block, helping to ensure that the associated idler gear is properly positioned within the gear train. An exemplary process for installing the exemplary disclosed stub shafts is described in more detail below.

To mount stub shaft 36, collar 56 may be inserted into cavity 90 to guide attachment of stub shaft 36 until end surface 54 contacts a surface of first stub shaft mount 44. Threaded rod 84 may then be inserted through recess 76 and axial bore 96, and into threaded hole 100. It should be understood that it is also possible for threaded rod 84 to be attached to threaded hole 100 first, with stub shaft 36 subsequently placed over threaded rod 84. In either instance, threaded rod 84 may be torqued and inner nut 114 may be threaded onto second threaded end 118 until secured in recess 76 to securely attach base end 50 to engine block 12. Bearing 40 and idler gear 26 may then be placed onto stub shaft 36 and properly positioned by thrust face 68.

Spacer 108 may be placed against ledge 78 and split ring washer 106 placed against spacer 108. Washer 116 may be placed on inner nut 114. Gear cover 82 may be positioned on engine block 12 such that distal end 72 is aligned with opening 102 in gear cover 82. Cap 86 may be placed into opening 102 with threaded rod 84 extending through aperture 120 until cap 86 contacts split ring washer 106 and washer 116. O-ring 104 may frictionally engage a radial portion of opening 102 to seal cap 86 in opening 102. Outer nut 112 may be secured to second threaded end 118 of threaded rod 84 and tightened until all components are secured in place. Stub shaft 38 and idler gear 28 may be installed on engine block 12 at second stub shaft mount 46 in a similar manner.

With stub shaft 36 secured in place, idler gear 26 may be positioned to connect to drive gear 18 and accessory gear 34 to transfer rotational energy from crankshaft 14 to an engine accessory. During operation, idler gear 26 may rotate via bearing 40, which may require lubricant to ensure smooth rotation. The configuration of axial bore 96 forming axial passage 128 provides a simple and cost effective manner in which lubricating oil may be supplied to bearing 40.

For example, lubricant may be supplied from oil supply passage 134 through stub shaft 36 to bearing 40. During operation, an oil pump (not shown) may pressurize lubricating oil and deliver it to fill well 130. As pressure increases in well 130, lubricating oil may be forced into axial passage 128 formed in axial bore 96. The lubricating oil may flow through axial passage 128 and into radial passages 124. Radial passages 124 may deliver the lubricating oil to bearing 40 via openings 125. Oil may be supplied to idler gear 28 and bearing 42 via stub shaft 38 in a similar manner.

In addition to the above advantages, the inclusion of thrust face 68 may allow for proper positioning of idler gear 26 at a location spaced from engine block 12. Further, the shape and size of the disclosed stub shaft allow for efficient use of space, which may be beneficial in the crowded environment of an engine gear train. In particular, the relatively small area of engine block 12 required for attachment allows for other components (e.g., damper 16) to be installed smoothly. The stub shaft of the present disclosure combines the features described above to provide these and other associated benefits.

It will be apparent to those skilled in the art that various modifications and variations can be made to the engine of the present disclosure without departing from the scope of the disclosure. For example, although the stub shaft is shown as supporting an idler gear, it could alternatively be used to support other components. For example, the stub shaft may be associated with an accessory gear, a pulley, a belt, or other accessory component. The stub shaft may not be associated with a gear train, if desired. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A stub shaft, comprising:
   an elongated cylindrical body having a base end configured to be secured to an engine block, and an opposing distal end;
   a collar formed at the base end of the elongated cylindrical body and configured to be inserted into a cavity in the engine block to guide attachment of the stub shaft to the engine block;
   an axial bore formed in the elongated cylindrical body and passing from the base end to the distal end;

a radial passage formed in the elongated cylindrical body and in fluid communication with the axial bore; and a thrust face formed between the base end and the radial passage, wherein the axial bore includes a first section adjacent the base end and a second section adjacent the distal end, and a diameter of the first section is greater than a diameter of the second section.

2. The stub shaft of claim 1, wherein the thrust face has a first diameter that is greater than a second diameter at the base end.

3. The stub shaft of claim 2, further including a rounded portion connecting the thrust face to the base end.

4. The stub shaft of claim 2, wherein the second diameter is about 70-95% of the first diameter.

5. The stub shaft of claim 1, wherein the thrust face has a diameter that is about 70-95% of an axial distance between the thrust face and the collar.

6. The stub shaft of claim 1, wherein the radial passage includes two radial passages positioned at different locations along the length of the axial bore.

7. The stub shaft of claim 1, wherein the distal end is configured to be secured to a gear cover of the engine.

8. The stub shaft of claim 7, further including a recess formed in the distal end, the recess open to the axial bore and configured to receive a nut.

9. The stub shaft of claim 1, wherein a diameter of a center potion is less than a diameter of the distal end, such that a ledge is formed between the center portion and the distal end.

10. The stub shaft of claim 1, further including a dowel pin extending from the base end, the dowel pin configured to extend into a second cavity in the engine block.

11. An idler gear mounting assembly, comprising:
    a stub shaft, including:
        an elongated cylindrical body having a base end configured to be secured to an engine block and an opposing distal end;
        an axial bore formed in the elongated cylindrical body and passing from the base end to the distal end; and
        a radial passage formed in the elongated cylindrical body and in fluid communication with the axial bore; and
    a threaded rod extending through the axial bore, the threaded rod configured to secure the base end of the stub shaft to the engine block and the distal end of the stub shaft to a gear cover.

12. The idler gear mounting assembly of claim 11, wherein the stub shaft further includes a collar formed at the base end of the elongated cylindrical body and configured to be inserted into a cavity in the engine block to guide attachment of the stub shaft to the engine block.

13. The idler gear mounting assembly of claim 11, wherein the elongated cylindrical body further includes a thrust face formed between the base end and the radial passage.

14. The idler gear mounting assembly of claim 11, further including a cap configured to be secured to the gear cover, the cap including an aperture through which the threaded rod extends.

15. The idler gear mounting assembly of claim 14, wherein:
    the distal end includes a recess open to the axial bore, the recess configured to receive a nut, and
    the threaded rod is configured to be secured to the nut at an inner surface of the cap.

16. The idler gear mounting assembly of claim 14, wherein the cap includes an O-ring, and the O-ring is configured to frictionally engage the gear cover.

17. The idler gear mounting assembly of claim 11, further including a split ring washer and a spacer secured between the cap and a portion of the stub shaft.

18. The idler gear mounting assembly of claim 17, wherein the portion of the stub shaft is a ledge formed on an outer side of the shaft body, the spacer being configured to contact the ledge.

19. An engine, comprising:
    an engine block including a stub shaft mounting cavity and an oil supply passage;
    a gear cover engaging an outer portion of the engine block;
    a stub shaft secured at a base end to the engine block and at a distal end to the gear cover;
    an idler gear connected to the stub shaft;
    a threaded rod extending through the gear cover and the stub shaft and into the engine block;
    a cap connecting the threaded rod to the gear cover; and
    an oil passage configured to supply lubricating oil to the idler gear through a path formed within the stub shaft.

* * * * *